United States Patent [19]
Hata

[11] Patent Number: 4,846,264
[45] Date of Patent: Jul. 11, 1989

[54] COMPOSITE PIPE, PROCESS FOR PRODUCING THE SAME, AND HEAT PIPE USING THE SAME

[76] Inventor: Ryosuke Hata, c/o Osaka Works of Sumitomo Electric Industries, Ltd., 1-3, Shimaya 1-chome, Konohana-ku, Osaka, Japan

[21] Appl. No.: 166,695

[22] Filed: Mar. 14, 1988

Related U.S. Application Data

[62] Division of Ser. No. 64,390, Jun. 22, 1987, Pat. No. 4,817,259, which is a division of Ser. No. 811,164, Dec. 19, 1985, Pat. No. 4,733,699.

[30] Foreign Application Priority Data

Dec. 21, 1984 [JP] Japan ................... 59-271593

[51] Int. Cl.[4] ................. F28D 15/02; F28F 19/06
[52] U.S. Cl. ................. 165/104.27; 165/133; 165/180; 138/145

[58] Field of Search .......... 165/133, 104.27, 180; 138/145

[56] References Cited

FOREIGN PATENT DOCUMENTS 47157 4/1979 Japan .................................. 165/133
112690 7/1982 Japan .................................. 165/133

Primary Examiner—Albert W. Davis, Jr.
Attorney, Agent, or Firm—Harness, Dickey & Pierce

[57] ABSTRACT

A composite pipe is proposed which is comprised of an aluminum pipe and a lead pipe formed in the aluminum pipe in direct contact with the inner wall of the aluminum pipe. The composite pipe is produced by supplying a lead pipe to a continuous aluminum extrusion machine which can extrude while enveloping a long object, to form an aluminum pipe on the outer periphery of the lead pipe. A heat pipe using the composite pipe is also proposed.

1 Claim, 4 Drawing Sheets

COMPOSITE PIPE, PROCESS FOR PRODUCING THE SAME, AND HEAT PIPE USING THE SAME

This is a division of U.S. patent application Ser. No. 064,390 filed June 22, 1987, now U.S. Pat. No. 4,817,259, granted Apr. 4, 1989 which is a division of Ser. No. 811,164 filed Dec. 19, 1985 now U.S. Pat. No. 4,733,699 granted Mar. 29, 1988.

The present invention relates to a composite pipe, process for producing the same, and a heat pipe using the same.

Alminum is high in electric conductivity, non-magnetic, high in heat conduction, and light in weight, and also has excellent ductility and malleability, and easy for continuous extrusion. It has recently been used e.g. as a metal sheath of long electric power cables for the sake of these advantages.

Aluminum pipes are continuously extruded by means of a continuous extrusion machine which can extrude while enveloping a long object. Thus, long seamless pipes can be produced. Besides, since the material itself is soft, pipes of a small diameter are flexible without corrugation, and can be transported by winding around a drum. Also, the pipes of a large diameter can be easily corrugated, and can be easily wound around a drum or laid at winding places. Furthermore, a considerable maximum tensile stress can be expected for aluminum, though not as high as that of iron, and it is possible to obtain pipes which can withstand a considerably high internal pressure.

However, aluminum pipes are inferior in corrosion resistance without particular anticorrosive treatment can be easily attacked by water, steam or methanol, and the abovesaid advantages can not be fully exhibited. For instance, aluminum pipes are not generally used for transportation of water, steam or chemical solutions such as methanol. If aluminum pipes are used for heat pipes with water or methanol used as the working fluid because of their high heat conduction, low price and safety, hydrogen gas may be generated due to reaction between this working fluid and aluminum after lapse of a long time. Thus, the working fluid is limited to Freon or the like.

On the other hand, lead is a very stable metal against corrosion, and resists water, steam and many chemicals. Lead is also high in conductivity, non-magnetic, high in heat conduction, rich in ductility, malleability and flexibility, and is applicable to long extrusion process. To the contrary, it is too soft and is poor in maximum tensile stress, which means that it cannot be used at high pressure when produced into pipes. Besides, it is very heavy. Hence, when it is used as pipes, its use has been extremely limited.

An object of the present invention is to provide corrosion resistant long composite pipes having both the advantage of lead and that of aluminum.

Another object of the present invention is to provide a process for producing such composite pipes.

A further object of the present invention is to provide a heat pipe with which water and methanol can be used as working fluid by using the composite pipe.

The term "a continuous extrusion machine which can extrude while enveloping a long object" means, in the case of alminum; e.g. an aluminum press for metal extrusion of power cable manufactured by Hydraulik GmbH of Germany and an aluminum press manufactured by Schloemann GmbH of Germany, and in the case of lead, means e.g. a so-called vertical lead encasing machine and a screw extrusion type machine widely used to produce a metal sheath of power cable, generally known as the Hansson type lead encasing machine.

In accordance with the present invention, there is provided a composite pipe comprising an aluminum pipe and a lead pipe, the latter being in contact with the inner wall of the aluminum pipe either directly or through a protective layer.

Since the lead pipe provided inside is resistant to corrosion by water, steam chemical such as methanol, or gas is used inside, such composite pipes have excellent corrosion resistance. Since a lead pipe is soft and small in maximum tensile stress, its form retaining ability is inferior and the internal pressure of the pipe cannot be raised. But these shortcomings resulting from its softness are compensated for by the aluminum pipe at outside. So, good pressure resistance and flexibility are obtained on the entire composite pipe. Thus, a long, seamless, flexible, and highly pressure-proof pipe is obtained which can transport liquids such as water and chemicals, and gas such as steam.

In accordance with the present invention, the composite pipe is manufactured as described below. After manufacturing a long lead pipe by use of a continuous lead extrusion machine, the lead pipe is supplied into a continuous lead extrusion machine, the lead pipe is supplied into a continuous aluminum extrusion machine which can extrude while continuously enveloping a long object, such as a metal sheath extruder for power cable, to coat the lead pipe with an aluminum pipe on its outside.

This may be performed by firstly winding a heat-soluble synthetic resin tape around the lead pipe to form a shape retaining layer and supplying the lead pipe to the aluminum extruder to form an aluminum pipe on the lead pipe while applying a sufficient pressure to the inside of the lead pipe to expand it when the shape retaining force of the shape retaining layer has decreased by heat. With this process, the tape of the shape retaining layer on the lead pipe melts in the extruder, allowing the lead pipe to expand under the internal pressure. On the lead pipe which is expanding, an aluminum pipe is formed by the extruder without any gap with respect to the lead pipe. If heat in the extruder is insufficient to melt the tape, a separate heating means may be used.

Or alternatively, after manufacturing a long lead pipe by use of a continuous extrusion machine, the lead pipe may be supplied into an aluminum continuous extrusion machine which can extrude while continuously enveloping a long object, to form an aluminum pipe on the lead pipe and pressure medium is sealed into the lead pipe to expand the lead pipe, so that the lead pipe will be expanded and pressed against the inner wall of the aluminum pipe more tightly.

In this case, the lead pipe may be brought into contact with the inner wall of the aluminum pipe directly or through a protective layer such as paint, adhesive cloth tape, heat-fusion plastic tape or extruded plastic layer.

By such a method, a composite pipe having a lead pipe placed in contact with the inner wall of an aluminum pipe can be obtained.

The heat pipe according to this invention has a container, which is a composite pipe comprising an aluminum pipe and a lead pipe mounted in contact with the inner wall of the aluminum pipe and working fluid charged into this container. A wick material is put into the container if necessary.

Therefore, since the working fluid is in contact with the corrosion resistant lead pipe, either water or methanol may be used as working fluid. What is more, since both metals are excellent in heat conduction, either the heat absorbing part or the heat discharging part of the heat pipe does not show a particularly high heat resistance.

Other features and objects of the present invention will become apparent from the following description taken with reference to the accompanying drawings, in which.

A composite pipe 1 according to this invention comprises an aluminum pipe 2 and a lead pipe 3 disposed in the aluminum pipe in contact with the inner wall of the aluminum pipe.

As the material for the lead pipe 3, lead or lead alloy (Cu+Te alloy, C alloy, ½ C alloy, etc.) applicable to the continuous extrusion process may be used.

Figure 2:
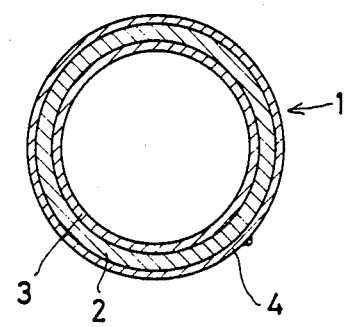
Figure 3:
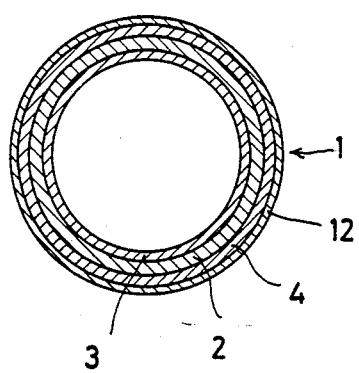

On the outer surface of the aluminum pipe, as shown in FIG. 2, a protective layer 4 of polyethylene, polyvinyl chloride, polybutene, nylon or the like may be formed by extrusion to improve the corrosion resistance of the outer surface of the aluminum pipe or to serve as a heat insulating layer. The protective layer 4 may be composed of a single or plural plies of tape of fusible polyethylene or rubber lined cloth. Or, for a greater efficiency of heat exchange on the outer surface of aluminum pipe 2, if the adiabatic protective layer is not provided on the aluminum pipe, if the external surface of the aluminum pipe may contact a corrosive gas, such as $SO_2$ and $SO_3$, or water, chemicals or other liquids or steam, a protective layer 4 of lead pipe should be formed on the outside of the aluminum pipe 2 for the same reason the outside of the aluminum pipe 2 for the same reason of placing a lead pipe 3 on the inner wall of the aluminum pipe 2. If the protective layer 4 is made of lead or lead alloy, the thermal conduction between inside and outside the composite pipe is particularly excellent as mentioned above. Furthermore, where heat insulation is required, the protective layer 4 should preferably be composed of a foamed plastic such as foamed styrol or foamed polyethylene, or glass wool or absestos. In this case, as shown in FIG. 3, a second protective layer 12 should be preferably formed on the protective layer 4 to retain the shape, prevent damage, resist water and corrosion and insulate heat. The layer 12 may be formed by extrusion of polyethylene, polyvinyl chloride, polybutene or nylon, or by winding a tape of fusible polyethylene or rubber lined cloth.

The composite pipe 1 according to the present invention may be manufactured in the following manner.

Firstly, a lead pipe 3 is extruded by use of a continuous lead extruder 5. The lead pipe is then supplied into a continuous aluminum extruder 6 which can extrude while enveloping a long object and, using the lead pipe 3 as a core, aluminum is continuously spread on the outer surface of lead pipe 3 to form an aluminum pipe 2 on the lead pipe.

The aluminum pipe 2 may be formed while expanding the lead pipe, in the manner described below. Before supplying a lead pipe to the continous aluminum extruder 6, a heat-soluble tape of synthetic resin is tightly wound around the lead pipe to form a shape retaining layer. The lead pipe is then supplied to the extruder while applying pressure to the inside of the lead pipe e.g. by gas. The pressure applied into the lead pipe should be such that at normal temperature the shape retaining layer formed on the outer surface of the lead pipe will prevent the lead pipe from expanding and the lead pipe will expand easily at temperatures where the synthetic resin tape forming the shape retaining layer melts or softens.

When the lead pipe is supplied to the extruder 6, the synthetic resin tape will melt by heat in the extruder and the shape retaining force of the shape retaining layer will decrease, so that the lead pipe 3 will expand by the internal pressure. Aluminum will be spread on the expanded lead pipe so that an aluminum pipe 2 will be formed on the outer surface of the lead pipe 3.

Because the lead pipe not coated with aluminum has a poor strength, it is often flattened when it is wound around a drum after extrusion. If the flattened lead pipe were supplied to the aluminum extruder 6 as it is, it might clog the point of the extruder. With the abovementioned process, if it is flattened when wound around a drum, it will be corrected so as to be circular because it is expanded by the internal pressure. This prevents the lead pipe from clogging the extruder. Therefore, it is unnecessary to have the diameter of the point of extruder much larger than that of the lead pipe 3. Thus, it is possible to form a lead pipe of a diameter slightly smaller than that of the aluminum pipe inside of the aluminum pipe 2. This decreases the degree of expanding the lead pipe after forming an aluminum pipe on the lead pipe, thus decreasing the degree of impairing the strength of the lead pipe by expansion. Higher production speed is another advantage. A further advantage is that even if the lead pipe is thin, the roundness of the lead pipe can be extremely high. Thus, composite pipes can be produced with high reliability and high productivity.

The shape retaining layer also serves as a mar preventive layer. The synthetic resin tape for the shape retainig layer may be made of polyethylene, vinyl chloride, polybutene or other material which melts at a temperature of 100° to 150° C.

The abovementioned process is also applicable to cases in which on the lead pipe is formed not an aluminum pipe but a welded corrugated pipe of steel, copper or stainless steel, or a plastic pipe such as polyethylene, vinyl chloride, polybutene or nylon.

If electric corrosion due to direct contact between different metals is feared, it is preferable to place a protective layer between the lead pipe 3 and the aluminum pipe 2. For this purpose, cloth tape, plastic tape or the like may be wound, either directly or together with an adhesive, paint or the like, on the continuously extruded lead pipe 3 after it has left the lead continuous extruder or in a separate process. A protective layer of polyethylene, polyvinyl chloride or the like may be formed on the lead pipe 3 in a separate process by extrusion.

Figure 5:
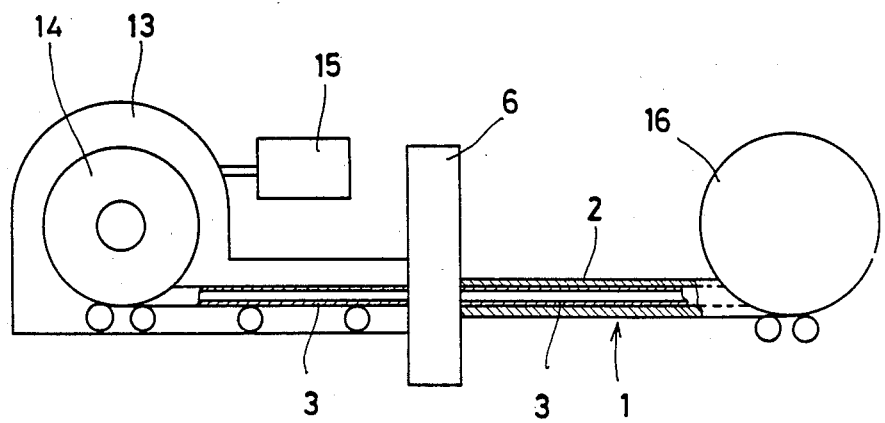
FIGS. 5-10 are schematic views showing how the composite pipes are produced.

To improve the contact between the aluminum pipe 2 and the lead pipe 3, air should not be preferably present between the two pipes. For this purpose, as shown in FIG. 5, a preferable process is to put a supply drum 14 having a lead pipe 3 wound therearound into a vacuum supply tank 13 known in the manufacture of OF (oil-filled) power cable, evacuate the supply tank 13 by means of a vacuum pump 15, and feed the lead pipe to a continuous aluminum extruder 6 in a vacuum state to coat the lead pipe 3 with an aluminum pipe 2. In FIG. 5, numeral 16 denotes a drum for taking up the composite pipe 1.

Figure 1:
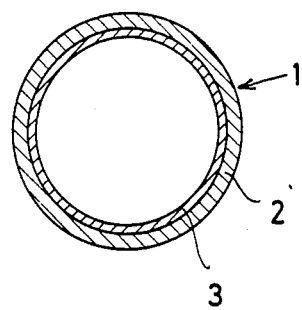
FIGS. 1-4 are sectional views of the composite pipes embodying the present invention.
Figure 6:
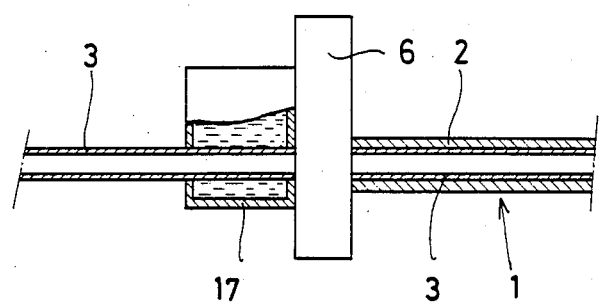

Furthermore, to improve the contact between the aluminum pipe 2 and the lead pipe 3, an adhesive effective to adhere two metals without leaving air therebetween, such as formal, or tar or petroleum paint or other corrosion preventive paint is filled in a dip tank 17 (FIG. 6), and the lead pipe 2 is sufficiently dipped in this tank and is then fed into the aluminum extruder 6 to obtain the composite pipe 1. In this case, though not shown in the drawing, an adhesive layer is formed between the lead pipes and the aluminum pipe 2 of the composite pipe 1 of FIG. 1.

Figure 7:
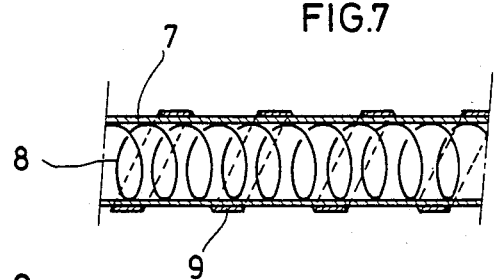
Figure 8:
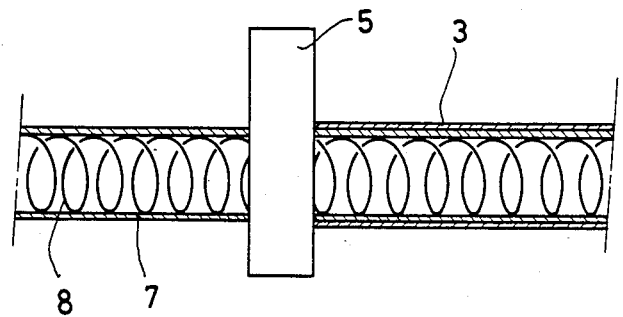
Figure 9:
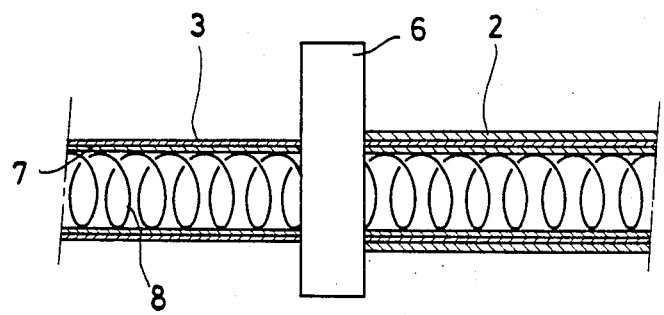

In this process, if this composite pipe 1 is used as the container of a heat pipe, a wick material 7 may be fixed to the inside of the lead pipe 2 of the composite pipe 1 in the following manner. If carbon fiber or metal mesh is used as the wick, in order to retain the shape of the wick material 7, a spiral 8 may be formed (FIG. 7) by use of stainless steel, copper, nylon or FRP. The wick material 7 is wound around the spiral 8, and fixed thereto by a binder material 9 (cloth tape, metal tape, wire, etc.), if necessary. The wick material 7 fixed to the spiral 8 is then supplied into a continuous lead extruder 6 which can extrude while enveloping a long object and, using the wick material 7 as the core, lead is continuously spread on the wick material 7 to form a lead pipe 3. (FIG. 8). The lead pipe thus formed may be cut to suitable lengths or wound around a drum, as required. The lead pipe is then supplied into a continuous aluminum extruder 6 which can extrude while enveloping a long object (FIG. 9). Aluminum is continuously spread on the lead pipe 3 which is used as the core, to form an aluminum pipe 2. The details of this manufacturing process are the same as in the production of the above-said composite pipe 1. In this state, in the case of a large-diameter pipe, it may be corrugated, if necessary, to improve the flexibility, by means of a corrugating machine. The composite pipe 1 thus manufactured may be cut to required lengths or wound around a drum.

In the above process, since the inside diameter of the aluminum pipe 2 manufactured by extrusion molding can be controlled very precisely, gap is seldom formed between the lead pipe 3 and the aluminum pipe 2. When corrugated as mentioned above, the aluminum pipe usually shrinks in diameter and bites into the lead pipe 3, so that the contact therebetween is further improved.

However, if the lead pipe 3 is partly hollowed or deformed due to corrugation to cause some gap between the lead pipe 3 and the aluminum pipe 2, both ends of the lead pipe 3 are fully closed and pressure medium such as gas and liquid should be sealed therein to pressurize the lead pipe against the inner wall of the aluminum pipe 2 (e.g. 2 to 50 kg/cm$^2$), thereby reforming the lead pipe to improve the contact between the alumunum pipe and lead pipe. As the method for contacting the lead pipe, it is sufficient to pressurize the lead pipe in the atmosphere at ordinary temperature. But, in order to pressurize more efficiently and securely, as it will be explained later, the composite pipe may be put into a supply tank 13 for power cable shown in FIG. 5, wound around a drum, and, though it is not necessary to evacuate the tank 13, the inside of the tank 13 be heated to 100° to 250° C. by passing steam through the steam coil provided in the tank 13, and the lead pipe 3 be pressurized in this state.

In the case of an extremely short composite pipes or composite pipe having a wick, the lead pipe may be brought into closer contact with the aluminum pipe by manufacturing the lead pipe and aluminum pipe separately, inserting the lead pipe into the aluminum pipe 2, putting the lead pipe into the tank 13 with its both ends ready to be fully closed, heating and evacuating the tank 13 to heat and pressurize the lead pipe while removing air from the gap between the lead pipe 3 and aluminum pipe 2 to cause the lead pipe 3 to contact the aluminum pipe tightly.

In this case, the heating temperature is not more than 250° C. because the strength of the aluminum pipe is lowered at higher temperature and also the strength of the lead pipe drops significantly, so that locally weak parts may be damaged by the internal pressure. For expansion of the lead pipe 3, the maximum limit of internal pressure should be 50 kg/cm$^2$, because with the composite pipe of a large diameter, not only the lead pipe but also the aluminum pipe may be deformed at higher pressure. As the method of pressurization, if the maximum pressure is applied suddenly, locally weak parts of the lead pipe 3 may be broken. So it is preferable to raise the pressure gradually, for example, by holding 5 kg/cm$^2$ for an hour, 10 kg/cm$^2$ for an hour, 15 kg/cm$^2$ for an hour, and so forth until reaching the maximum pressure.

Figure 4:
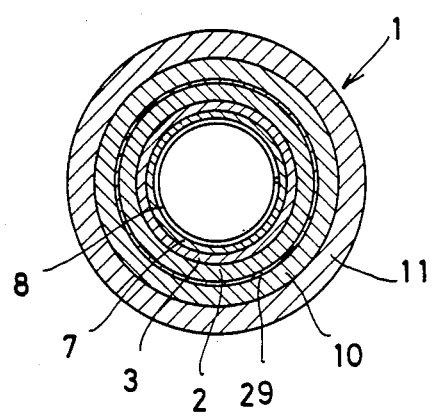

As shown in FIG. 4, the outer surface of the aluminum pipe 2 may be, for protection from corrosion and heat insulation, coated with rust preventive paint 29 and then polyethylene or polyvinyl chloride 10. Furthermore, an insulating material 11 such as asbestos and glass wool may be wound around the outer surface. Or, as shown in FIG. 3, a second protective layer 12 may be formed on the protective layer 4.

Thus, a composite pipe 1 for heat pipe is produced having such a section as shown in FIG. 4, if the wick is needed, or in FIG. 2 or FIG. 3 if no wick is needed.

Depending on the application, if the outer surface of the aluminum pipe 2 cannot be coated with a nonmetallic paint, as shown in FIG. 2, it is preferable to coat the outer surface of aluminum pipe 2 with a copper pipe as a protective layer 4 by means of a continuous lead extruder 5 which can extrude while enveloping a long object in the procedure shown in FIG. 8. To improve the contact between the protective layer 4 and the aluminum pipe 2, after extrusion molding, it is preferable to subject the pipe to draw or press forming by use of dies or rolls.

Figure 10:
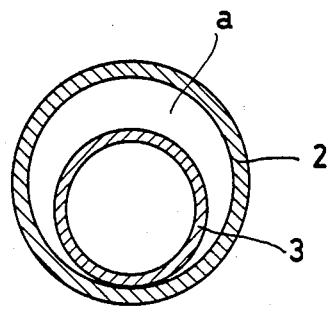

Next, as shown in FIG. 10, by inserting a lead pipe 3 into an aluminum pipe 2 and expanding the lead pipe by sealing a pressure medium in it, the lead pipe may be brought in tight contact with the inner wall of the aluminum pipe.

In doing so, if the wall thickness of the lead pipe 3 is relatively small and its length is relatively short, an aluminum pipe 2 slightly larger in diameter than a lead pipe 3 may be manufactured beforehand by an unspecified aluminum pipe extruder, and a lead pipe 3 manufactured by extrusion molding may be inserted into the aluminum pipe 2 right after extrusion. The both ends of the lead pipe 3 are closed and a pressure medium is charged thereinto to expand the diameter of the lead pipe, thereby causing the lead pipe to contact tightly the inner wall of the aluminum pipe. At this time, with an end of the lead pipe 3 closed, the lead pipe may be extruded and inserted into the aluminum pipe 2 while pressurizing to such an extent as to retain the shape by air or the like from the extrusion outlet of the continuous lead extruder 5. If a lead pipe having a sufficient wall thickness to retain its shape at atmospheric pressure is used, a lead pipe and an aluminum pipe may be separately prepared, and the lead pipe may be inserted into the aluminum pipe.

When manufacturing a pipe long enough to be wound around a drum, the following procedure is applicable. Firstly, a lead pipe having a sufficient wall thickness to retain its shape and having as large a diameter as possible but insertable into an aluminum pipe of a desired diameter is prepared. The lead pipe is supplied into a continuous aluminum extruder which can extrude while enveloping a long object to form an aluminum pipe 2 on the outer surface of the lead pipe as shown in FIG. 10. Next, a pressure medium of gas or liquid is sealed in the lead pipe 3, and the lead pipe is pressurized gradually toward the outside (e.g. initially 2 to 5 kg/m$^2$G) to expand the diameter of the lead pipe 3 gradually to contact it against the inner wall of the aluminum pipe 2. In this case, it is preferable to pressurize the lead pipe while evacuating the gap between the lead pipe and the aluminum pipe by means of a vacuum pump. At this time, the aluminum pipe 2 and lead pipe 3 may be put in a vacuum drying tank used in the manufacture of ordinary OF power cable, wound around the drum, and while heating to 100° to 200° C. the aluminum pipe 2 and the lead pipe 3 are evacuated either together with the tank with both ends of a gap (a in FIG. 10) formed between the aluminum pipe and the lead pipe being kept open, or with both ends of the gap closed when the tank is at atmospheric pressure, so that the lead pipe 3 will be tightly contacted with the inner wall of the aluminum pipe 2.

The method of pressurizing the lead pipe 3 and evacuating the gap between the lead pipe and the aluminum pipe will be further described below. Both ends of the aluminum pipe and the lead pipe are closed tightly, if necessary, by use of terminating metals and both closed ends are reinforced with expoxy or the lime, and branch pipes are provided to communicate with the gap a and the inside of lead pipe, and the branch pipe communicating with the gap a is used in evacuating, while the branch pipe communicating with the inside of lead pipe 3 is used in pressurizing.

Figure 11:
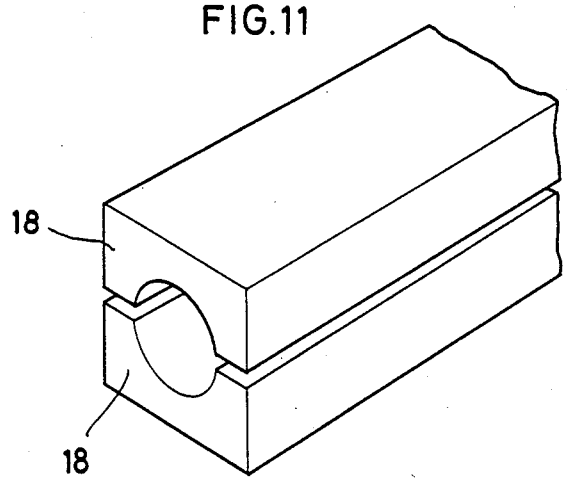
FIG. 11 is a perspective view of a dies.

In this process, if the lead pipe does not have a spiral 8 for retaining its shape or a sufficient wall thickness to retain its shape, it may be supplied into a continuous aluminum extruder while retaining its shape by means of dies 18 of a half split type made of wood block or nylon as shown in FIG. 11.

When using a composite pipe 1 manufactured in the abovesaid process as a heat pipe, working fluid may be sealed merely with both ends closed, if wick is not needed. If needed, after the inside of the lead pipe has been lined with wick material 7, working fluid may be sealed. In the case of a long heat pipe, if the required length is known, the pipe may be charged with working fluid in a factory. If the required length is not known, the composite pipe 1 lined with wick material 7 may be laid from a drum reel, be evacuated from its one or both ends, and be charged with a required volume of working fluid. Now, a heat pipe is obtained by closing its both ends. If a heat pipe is manufactured in this way, it may be easily suited to the actual field laying conditions. Thus a practical heat pipe may be obtained.

Figure 12:
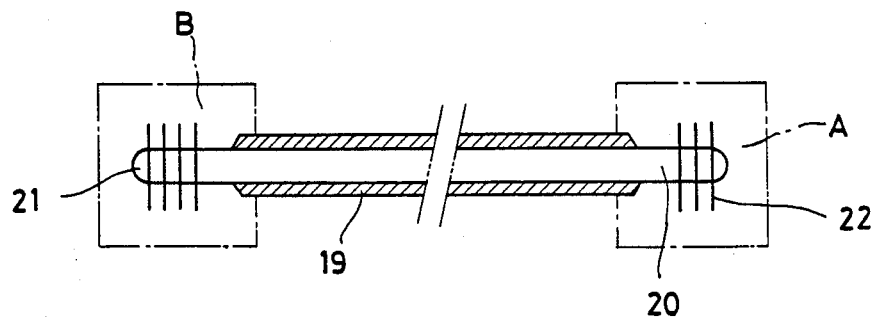
FIG. 12 is a schematic view of a heat pipe embodying the present invention.

FIG. 12 shows an example of the heat pipe in use on which a heat insulating part 19 is formed by providing a heat insulation and protective layer in the center, with a heat absorbing part 20 and a heat releasing part 21 formed at both ends. If both parts A and B surrounding the heat absorbing part 20 and the heat releasing part 21 are both air, the insulation layer and protective layer are peeled off at both parts to expose the aluminum pipe 2. Fins 22 may be provided on the parts, if necessary. If part A is steam or hot water and part B is air, a lead pipe must be spread on the outside of the aluminum pipe at least part A. However, it is not necessarily required to apply a lead pipe over the entire length. At least the metal surface of the heat absorbing part 20 in contact with part A has to be encased. Of course, the aluminum pipe 2 may be protected not with a lead pipe but with a corrosion preventive material such as thin Teflon, although this decreases the efficiency of heat exchange. As for part B, if prevention of corrosion is necessary for the aluminum pipe, the same treatment as in part A may be applied.

Next, it will be described how the composite pipes according to the present invention should be connected.

Figure 16A:
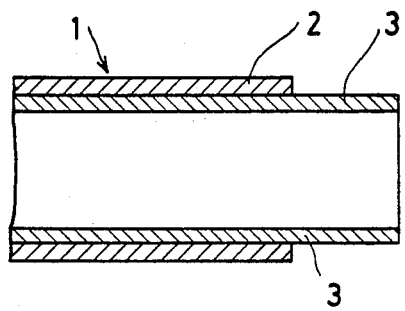
Figure 16B:
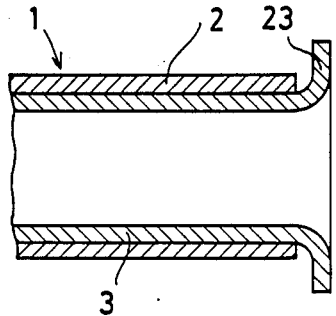

Firstly, the end of the aluminum pipe 2 at the end of the composite pipe 1 is cut off to expose part of the lead pipe 3, as shown in FIG. 16A. The exposed portion 23 is then expanded (as in FIG. 16B) in a vertical direction by use of a tube expander to form a flange. The tube expander used should be made of e.g. nylon not to mar the inner wall of the lead pipe 3.

Figure 13:
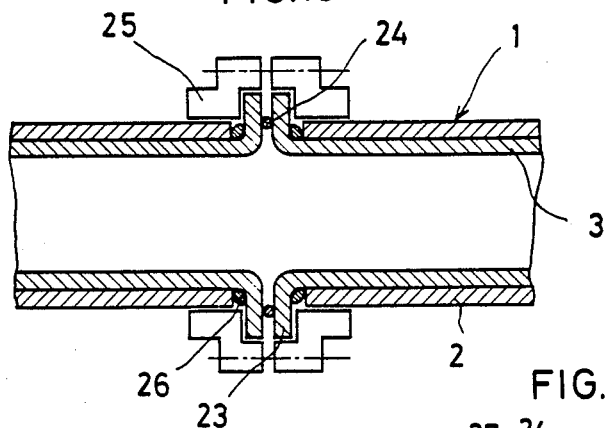
FIGS. 13-16 are sectional views showing how the composite pipes of the present invention are connected.

In the example of FIG. 13, the composite pipes 1 having a flange 23 formed at their end in such a manner are connected by bringing together their flange portions 23 with a packing 24 therebetween, mounting aluminum flanges 25 on the flanges 23, and tightening the flanges 25 together with bolts. O-ring 26 of rubber may be placed between the edge of the aluminum pipe and the expanded portion 23 of the lead pipe to prevent the outer wall of the lead pipe from being marred by the edge of the aluminum pipe.

Figure 14:
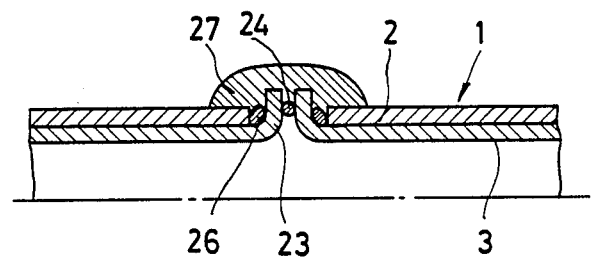

In the second example of FIG. 14, the flange portions 23 are brought together with a packing 24 therebetween and fully caulked together. Glass tape impregnated with epoxy resin is then wound around the connected portion to form a reinforced layer 27.

Figure 15:
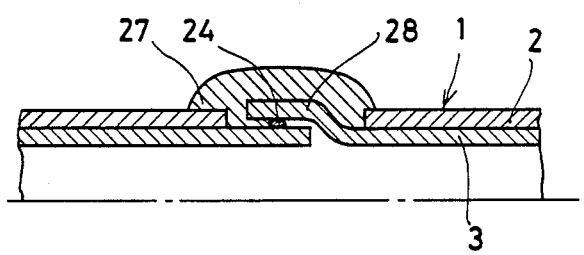

In the third example of FIG. 15 the exposed portion of one composite pipe 1 is not expanded whereas that of the other composite pipe is expanded slightly. The expanded end 28 of the other pipe is put on the exposed but not expanded end of one pipe with a packing 24 therebetween and they are fully caulked together. Glass tape impregnated with epoxy resin is wound around the connected portion to form a reinforced layer 27.

With the abovementioned method for connection, flanges can be formed merely by exposing part of the lead pipe and expanding the exposed end. Aluminum flanges or glass tape impregnated with epoxy resin are the only necessary parts. Therefore, the connection is possible with low cost and light weight.

The composite pipe of this invention, which has a corrosion resistant lead pipe in contact with the inner wall of an aluminum pipe, can be used to convey water, steam, chemicals, or other liquids or gases, or their mixtures, which could not be conveyed by the aluminum pipe alone, while heat insulating where necessary.

Since the outside of the composite pipe is an aluminum pipe, a long seamless pipe can be manufactured by extrusion molding. The entire composite pipe is flexible enough to be carried wound around a drum or laid at winding places. Thus, the reliability and ease of installation are outstandingly high as compared with the conventional installation method of a long pipe by connecting short pipes in the field by welding or flange connection.

If heat insulation is required, the pipe may be treated with insulating material at shop. This suggests that the usefulness of this composite pipe is extremely high as compared with the conventional process of applying heat insulation treatment at least at the connected parts or over the entire length, if necessary, in the field, after connecting short pipes together.

Furthermore, by the process of this invention, such excellent composite pipes can be manufactured easily.

Since the heat pipe of this invention is achieved by forming a composite pipe by mounting a lead pipe to the inside of an aluminum pipe, fitting a wick material, if necessary, to the inner wall of the lead pipe of the composite pipe, and sealing with working fluid, the kind of working fluid is not limited. It can be used with water, methanol and others which the conventional aluminum pipes could not use.

What we claim:

1. A heat pipe having as a container a composite pipe comprising an aluminum pipe and a lead pipe provided in said aluminum pipe and having its outer wall in contact with the inner wall of said aluminum pipe, and a working fluid sealed in said container.

* * * * *

UNITED STATES PATENT AND TRADEMARK OFFICE
CERTIFICATE OF CORRECTION

PATENT NO. : 4,846,264

DATED : July 11, 1989

INVENTOR(S) : Ryosuke Hata

It is certified that error appears in the above-identified patent and that said Letters Patent is hereby corrected as shown below:

On the Title Page, insert the heading and information:

--Assignee: Sumitomo Electric Industries, Ltd.,

Osaka, Japan--.

Column 1, line 13, "Alminum" should be --Aluminum--.

Column 1, line 65, "alminum" should be --aluminum--.

Column 2, lines 26-27, delete "the lead pipe is supplied into a continuous lead extrusion machine,".

Column 3, line 18, "dies" should be --die--.

Column 3, lines 44-45, delete "for the same reason the outside of the aluminum pipe 2".

Column 3, line 55, "absestos" should be --asbestos--.

Column 4, line 47, "retainig" should be --retaining--.

Column 5, line 63, "alumunum" should be --aluminum--.

Column 6, line 6, "pipes" should be --pipe--.

Column 7, line 23, "$kg/m^2 G$" should be --$kg/cm^2$--.

UNITED STATES PATENT AND TRADEMARK OFFICE
CERTIFICATE OF CORRECTION

PATENT NO. : 4,846,264

DATED : July 11, 1989

INVENTOR(S) : Ryosuke Hata

It is certified that error appears in the above-identified patent and that said Letters Patent is hereby corrected as shown below:

Column 7, line 45, "expoxy" should be --epoxy--.

Column 7, line 45, "lime" should be --like--.

Signed and Sealed this

Twenty-fifth Day of February, 1992

Attest:

Attesting Officer

HARRY F. MANBECK, JR.

Commissioner of Patents and Trademarks